Dec. 10, 1968     T. H. SEITZ     3,415,408
INSULATED TANK
Filed Sept. 14, 1965     2 Sheets-Sheet 1
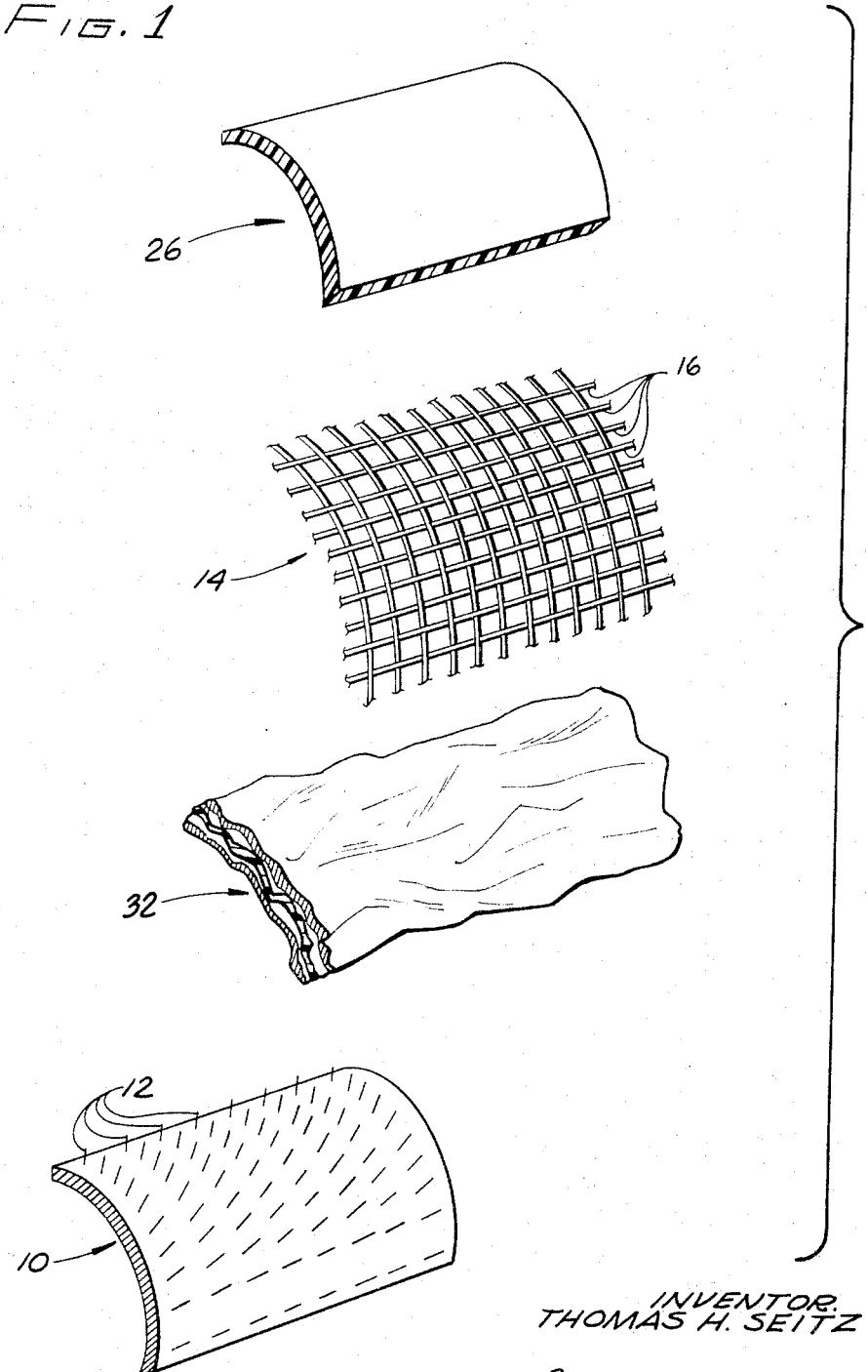
INVENTOR.
THOMAS H. SEITZ
By Sidney Magnes
AGENT Dec. 10, 1968     T. H. SEITZ     3,415,408
INSULATED TANK
Filed Sept. 14, 1965     2 Sheets-Sheet 2
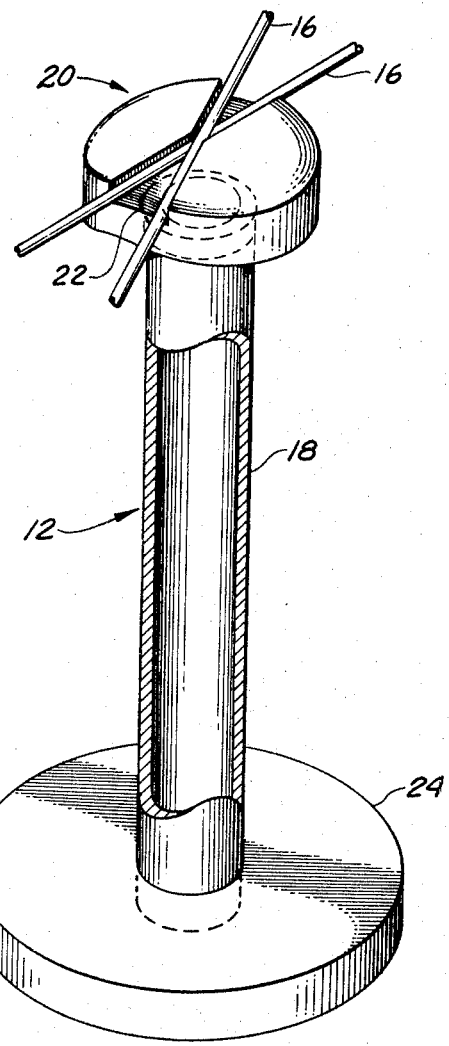
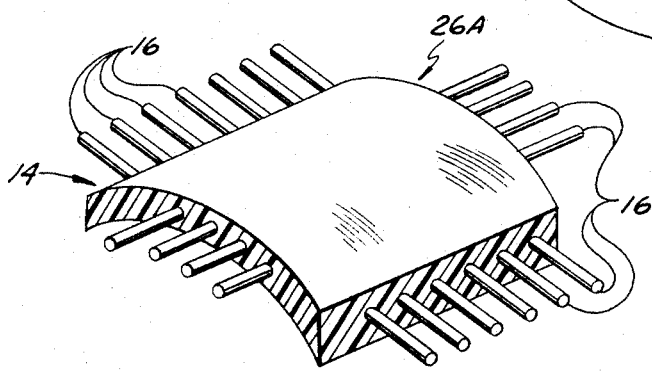
INVENTOR.
THOMAS H. SEITZ
By Sidney Magnes
AGENT

United States Patent Office 3,415,408
Patented Dec. 10, 1968

3,415,408
INSULATED TANK
Thomas H. Seitz, Riverside, Calif., assignor to North American Rockwell Corporation, a corporation of Delaware
Filed Sept. 14, 1965, Ser. No. 487,210
7 Claims. (Cl. 220—15)

ABSTRACT OF THE DISCLOSURE

This invention relates to an insulated tank; and more particularly to a tank that is designed to hold cryogenic liquids for a long period of time. Broadly speaking, the present invention contemplates an evacuated double-walled vessel for cryogenic fluids, the outer wall being a thin flexible plastic membrane that is lightweight and non-porous. The lightweight plastic membrane is supported by a net-like mesh of strands, that is in turn supported by posts attached to the inner wall. In this way, the gas-impermeable mesh membrane outer wall envelopes and seals the inner wall, can withstand atmospheric pressure, and is extremely lightweight.

BACKGROUND

It is well known that many present-day space vehicles use "cryogenic" fuels, that is, fuels that are at an extremely low temperature; these fuels generally being liquid hydrogen and liquid oxygen. Since these fuels are extremely cold, their tanks must be insulated to prevent external heat from leaking into them, and causing the liquids to boil off; and many attempts have been made to provide suitably insulated tanks for these cryogenic fuels.

Generally speaking, the tanks have taken the form of a double-walled enclosure—i.e., two concentric shells—having the space between the walls evacuated, in the manner of a Dewar flask or a Thermos bottle. It should be recalled that heat can be transmitted in three ways; namely by convection, by conduction, and by radiation. In the Dewar flask type of tank, the transmission of heat by convection is minimized by evacuating the space between the walls of the tank, so that no gas is present to produce heat-transmitting convection currents. In order to minimize the transmission of heat by conduction, the Dewar-flask type of tank avoids heat-conducting paths between ones wall of the tank and the other. In order to minimize the transmission of heat by radiation, the Dewar-flask type of tank has the inner surface of the outer wall and the outer surface of the inner wall silvered, so that heat is reflected back in the direction from whence it came.

In manufacturing large-sized cryogenic fuel tanks for space travel, the above procedures cannot be followed to a completely satisfactory extent, partly because the tank must be as lightweight as possible. For example, not much can be done about the inner fluid-containing shell; but the outer shell can be thinned to reduce its weight. However, if thinned too much, it frequently cannot support itself against the atmospheric pressure, and therefore supporting members must be positioned in the space between the two walls. However, these supporting members tend to transmit heat, by conduction, to the cryogenic fluid within the inner shell. Moreover, in practical cryogenic tanks, in order to further reduce heat transmission by radiation, the space between the walls is filled with a material known as "super-insulation," such as NRC-2, which comprises crinkled sheets of metal-coated plastic film, so that there are a plurality of reflecting surfaces to minimize the transfer of heat by radiation; the crinkled configuration producing long, small-cross-section paths for minimum heat transmission by conduction. It should be noted in passing, that this type of super-insulated material must not be compacted; otherwise it tends to behave more like a solid sheet of metal that conducts heat readily.

As a result, prior-art cryogenic tanks tended to have a strong, and therefore heavy, outer shell that can withstand atmospheric pressure. While these prior-art tanks are ordinarily satisfactory for ordinary storage, their weight prohibits their use in space projects.

OBJECTS AND DRAWINGS

It is therefore an object of the present invention to provide an improved insulated tank.

It is another object of the present invention to provide an insulated tank for cryogenic fluids.

It is a further object of the present invention to provide a lightweight insulated tank for cryogenic fluids.

The attainment of these objects and others will be realized from the teachings of the following specification, taken in conjunction with the drawings, of which:

FIGURE 1 is an exploded-type view of one embodiment of the invention;

FIGURE 2 is a view of a support post; and

FIGURE 3 is a view of another embodiment of the outer shell.

INTRODUCTION

As indicated above, the usual prior-art tank for cryogenic fluids is a sphere or a cylinder of the Dewar-flask type; and comprises a thin-as-possible outer metallic shell, and a strong thick metallic inner shell. Between the walls is placed an insulator of foamed-plastic, honeycomb structure, or super-insulation; the insulator sometimes acting as a mechanical support between the inner and outer walls of the tank, in order to minimize the strength requirements of the outer shell.

As indicated above, it is desirable to evacuate the space between the walls, but unfortunately, because of problems associated with the fabrication of large tanks, the outer wall of the tank is generally permeable to air; and air leakage spoils the vacuum between the walls. In addition, "cryopumping" causes a flow of external air into the space between the walls—where the oxygen, nitrogen, and moisture tend to freeze. This has two effects. Firstly, the process of freezing on the cold wall of the inner shell produces heat, which causes the cryogenic fluids to boil; and secondly, the freezing reduces the pressure in the space between the walls, and encourages more external air to enter the space between the walls. Thus, the presence and movement of this air voids the desired concept of having the space between the walls evacuated. Therefore, the tank does not behave in the manner of a Dewar flask.

In order to eliminate this problem, the outer shell is made substantially impermeable, which eliminates the presence of air; but as discussed above, when air is eliminated, a vacuum exists, which creates the requirement that the outer shell withstand external atmospheric pressure—but this introduces a weight problem. Alternatively, the area between the two walls may be filled with helium, which does not freeze, and therefore avoids the problem introduced by cryopumping. However, under this condition, the tank acts as though it had two walls separated by helium, rather than being evacuated; the helium conducting heat poorer than air, but better than a vacuum. Thus, these modifications produce either a heavy tank, or one that has a poor insulation characteristic.

DESCRIPTION OF INVENTION

An embodiment of the invention is shown, in a fragmentary exploded-view manner, in FIGURE 1, the embodiment being a dual-wall closed container having an evacuated space between its walls. Here the inner fluid-containing shell 10 of any suitable rigid material, such as aluminum, steel, etc., has a plurality of support posts 12 that extend radially from inner shell 10; so that the overall structure has the appearance of a porcupine. A reticulated mesh-like net 14, only a fragment of which is shown, is supported by the support posts 12; net 14 being formed preferably of a single strand of fiber 16, such as nylon, stainless steel, piano wire, or the like, that is wound around the inner shell 10 in such a way that the intersections of the mesh occur at the support posts 12, as shown in FIGURE 2. One spherical model used piano wire 0.030 inch in diameter, having a tensile strength of 200,000 lbs./in.$^2$; and was wound in such a way that the "intersections" did not overlap. Under some conditions, mesh 14 may take the form of expanded metal.

The supporting posts 12 (see FIGURE 2) have a relatively small-diameter shaft 18 similar to hollow hypodermic needles, to minimize heat conduction; and a head 20, having an X-shaped outer recess 22 and a cylindrical recess fits over the top of shaft 18, and is affixed thereto by bonding the shaft to the inner recess. The base of shaft 18 preferably fits into, and is secured within a recess of a positioning disc 24 that is in turn bonded to outer surface of inner shell 10. As a result of the net-lacing operation, the fibers 16 of net 14 are under tensile stress; whereas posts 12 are under compression. It has been found that a tubular supporting post 12, of a suitably strong material such as stainless steel, provides optimum compression strength and bending resistance, and produces minimal heat-conduction losses.

Referring back to FIGURE 1, net 14 is covered with a thin, flexible, light weight membrane-like outer shell 26 of gas-impermeable material such as Mylar; outer shell 26 fitting snugly against, and being supported by net 14. It should be noted that a sheet of Mylar .005 inch thick is substantially non-porous to air. It is preferable that a super insulative material 32 be positioned between the two shells 10 and 26, where it may remain in its non-compacted form, effectively "speared" against lateral movement by the supporting posts 12. For proper operation of such material, it must not be crushed and should be in an area of vacuum.

Alternatively, as shown in FIGURE 3, the outer shell 26A may be integral with the fibers 16 that form net 14.

As a result of this structure, a relatively lightweight cryogenic-fluid tank comprises a rigid inner shell, and an outer shell of an impermeable film of plastic, the space between the two shells being evacuated. Collapse of the outer shell is prevented by net 14 and support posts 12. Since the space between the walls is evacuated, and filled with super-insulation, heat transmission by convection and radiation is minimized; and, since supporting posts 12 are relatively long and thin, heat transmission by conduction is also minimized. Since the outer shell is non-rigid, the structure is preferably supported by a plurality of reticulated mesh-like "sacks" that encircle or partly enclose the tank, and are attached to the vehicle structure to provide opposite and various directional tensional forces to support the tank; although alternatively, trunnions may be fastened to the rigid inner shell.

It is of course necessary to have fill pipes, vent-pipes, etc.; and these (not shown) are preferably in a concentric arrangement to minimize heat transmission, and to minimize the number of openings through the outer shell. Where necessary, the openings for these pipes may be insulated by plugs formed in accordance with the teachings of patents such as 1,755,898; 2,068,180; and 2,894,538.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:
1. A tank for containing cryogenic material, comprising:
   a vessel having a shape retaining inner wall;
   a gas impermeable flexible membrane enveloping said wall, and spaced therefrom;
   a reticulated network of strands completely supporting the membrane against an inwardly directed pressure differential produced as a result of a vacuum between said inner wall and said membrane; and
   a plurality of rigid low-thermal conductivity small-diameter support posts secured to and between the inner wall and network of strands, to support the network and membrane in spaced relation to the wall.
2. A double-walled tank, comprising:
   a shape retaining inner wall;
   a flexible membrane-like outer wall;
   a plurality of support-posts secured on the outer face of said inner wall with their longitudinal axes extending radially outwardly from said inner wall; and
   a reticulated net-like mesh of strands supported by the outer ends of said plurality of support-posts completely supporting said membrane-like outer wall against an inwardly directed pressure differential produced as a result of a vacuum between said walls.
3. The combination of claim 1 including super-insulation positioned in the space adjacent said wall, said super-insulation being speared by said support-posts against lateral movement and being held from radial movement by said net-like mesh of strands.
4. A double-walled tank, comprising:
   an inner wall;
   a plurality of support-posts secured on the outer face of said inner wall with their longitudinal axes extending radially outwardly from said inner wall;
   a net-like mesh of strands supported by the outer ends of said plurality of support-posts; and
   a membrane-like outer wall, said membrane-like outer wall being integral with said mesh.
5. A double-walled tank comprising:
   an inner closed wall;
   a plurality of support-posts, said posts having a head that contains a notch, said support-posts being secured on the outer face of said inner wall with their longitudinal axes extending radially outwardly from said wall and with their heads projecting outwardly from said inner wall;
   a net-like mesh of strands, said mesh being supported and positioned with the strands thereof in said notches of said heads of said posts, so that said strands are in tension, and said posts are in compression; and
   a membrane-like outer shell supported by said mesh.
6. A double-walled tank comprising:
   an inner closed wall for containing a cryogenic fluid;
   a plurality of cup-like receptacles fixed on the outer surface of said wall;
   a like plurality of support-posts, said posts having a head that contains an X-shaped notch, said support-posts being positioned in said receptacles with their longitudinal axes extending radially outwardly from said wall and with their heads projecting outwardly from said inner wall;
   a net-like mesh of strands, said mesh being supported and positioned with the strands thereof in said notches, so that said strands are in tension, and said posts are in compression;
   a membrane-like outer shell supported by said mesh; and
   a super-insulation positioned between said inner and outer shells.
7. A double-walled tank comprising:
   a rigid inner closed wall for containing a cryogenic fluid;

a plurality of cup-like receptacles affixed on the outer surface of said wall;

a like plurality of support-posts, said posts being small-diameter hollow-tubes having a head that contains an X-shaped notch, said support posts being positioned in said receptacles, each with its longitudinal axis and its head projecting radially outwardly from said inner wall;

a net-like mesh of strands, said mesh being supported and positioned by said heads of said posts;

a membrane-like outer shell supported by said mesh; and a super-insulation positioned between said inner wall and said outer shell, the space between said wall and shell being evacuated, so that said strands are in tension, said posts are in compression, and super-insulation is not compacted.

References Cited

UNITED STATES PATENTS

| | | | |
|---|---|---|---|
| 1,355,413 | 10/1920 | Muddiman | 220—15 |
| 1,787,101 | 12/1930 | Bramwell. | |
| 2,000,882 | 5/1935 | Comstock. | |
| 2,206,680 | 7/1940 | Sitton. | |
| 2,702,458 | 2/1955 | Del Mar. | |
| 2,892,563 | 6/1959 | Morrison | 220—15 |
| 3,007,596 | 11/1961 | Matsch | 220—15 |
| 3,149,742 | 9/1964 | Hay et al. | |
| 3,204,804 | 9/1965 | Hnilicka. | |

THERON E. CONDON, *Primary Examiner.*

JAMES R. GARRETT, *Assistant Examiner.*